United States Patent
Nourbakhsh et al.

(10) Patent No.: US 10,270,984 B2
(45) Date of Patent: *Apr. 23, 2019

(54) VIDEO ROTATION SYSTEM AND METHOD

(71) Applicants: Farhad Nourbakhsh, Apple Valley, MN (US); Steven Brown, Chaska, MN (US)

(72) Inventors: Farhad Nourbakhsh, Apple Valley, MN (US); Steven Brown, Chaska, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,094

(22) Filed: Dec. 14, 2017

(65) Prior Publication Data

US 2018/0109738 A1    Apr. 19, 2018

Related U.S. Application Data

(63) Continuation of application No. 12/958,852, filed on Dec. 2, 2010, now Pat. No. 9,883,116.

(51) Int. Cl.
*H04N 5/262* (2006.01)
*H04N 1/387* (2006.01)
*H04N 5/232* (2006.01)

(52) U.S. Cl.
CPC ......... *H04N 5/2628* (2013.01); *H04N 1/3877* (2013.01); *H04N 1/387* (2013.01); *H04N 1/3872* (2013.01); *H04N 5/232* (2013.01); *H04N 5/23258* (2013.01); *H04N 5/23267* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 5,227,889 A | 7/1993 | Yoneyama et al. | |
| 5,900,909 A | 5/1999 | Parulski et al. | |
| 5,940,128 A | 8/1999 | Morimura | |
| 6,473,123 B1 | 10/2002 | Anderson | |
| 6,563,535 B1 | 5/2003 | Anderson | |
| 9,883,116 B2 * | 1/2018 | Nourbakhsh | H04N 5/2628 |
| 2001/0007469 A1 | 7/2001 | Fuchimukai et al. | |
| 2003/0144813 A1 | 7/2003 | Takemoto et al. | |
| 2005/0083417 A1 | 4/2005 | Battles et al. | |
| 2005/0093891 A1 | 5/2005 | Cooper | |

(Continued)

OTHER PUBLICATIONS

Jan. 30, 2015 USPTO Office Action (U.S. Appl. No. 12/958,852).

(Continued)

*Primary Examiner* — Justin P. Misleh
(74) *Attorney, Agent, or Firm* — Tysver Beck Evans, PLLC

(57) ABSTRACT

A video recording device is described having an orientation sensor. The recording device rotates video data received from an image sensor according to signals received from the orientation sensor. The rotation occurs before the video data is compressed according to a video codec and stored on a tangible storage device. By rotating the video data before compression, the need for intensive, post-capture video rotation on the compressed video file is eliminated.

17 Claims, 4 Drawing Sheets

(56) References Cited

U.S. PATENT DOCUMENTS

| | | |
|---|---|---|
| 2005/0212931 A1 | 9/2005 | Gallagher et al. |
| 2006/0146144 A1 | 7/2006 | Salmelin et al. |
| 2008/0225165 A1 | 9/2008 | Kim |
| 2008/0252740 A1 | 10/2008 | Kim |
| 2008/0266415 A1 | 10/2008 | Noh |
| 2008/0284865 A1 | 11/2008 | Kim |
| 2008/0291509 A1 | 11/2008 | Noh |
| 2009/0015701 A1 | 1/2009 | Noh |
| 2010/0060792 A1 | 3/2010 | Corlett |
| 2010/0104221 A1 | 4/2010 | Yeung et al. |
| 2010/0245601 A1 | 9/2010 | Kato |
| 2010/0309321 A1 | 12/2010 | Brunner et al. |
| 2011/0149116 A1 | 6/2011 | Kim |
| 2011/0261217 A1 | 10/2011 | Muukki et al. |

OTHER PUBLICATIONS

Mar. 13, 2014 USPTO Office Action (U.S. Appl. No. 12/958,852).
Jun. 12, 2015 USPTO Office Action (U.S. Appl. No. 12/958,852).
Sep. 4, 2013 USPTO Office Action (U.S. Appl. No. 12/958,852).
Fixed-Price Novelty Search Report.
Fairchild Semiconductor, TMC2302A Datasheet, May 20, 1998.
Silicon Optix, sxW1/sxW1-LX Product Brief.

\* cited by examiner

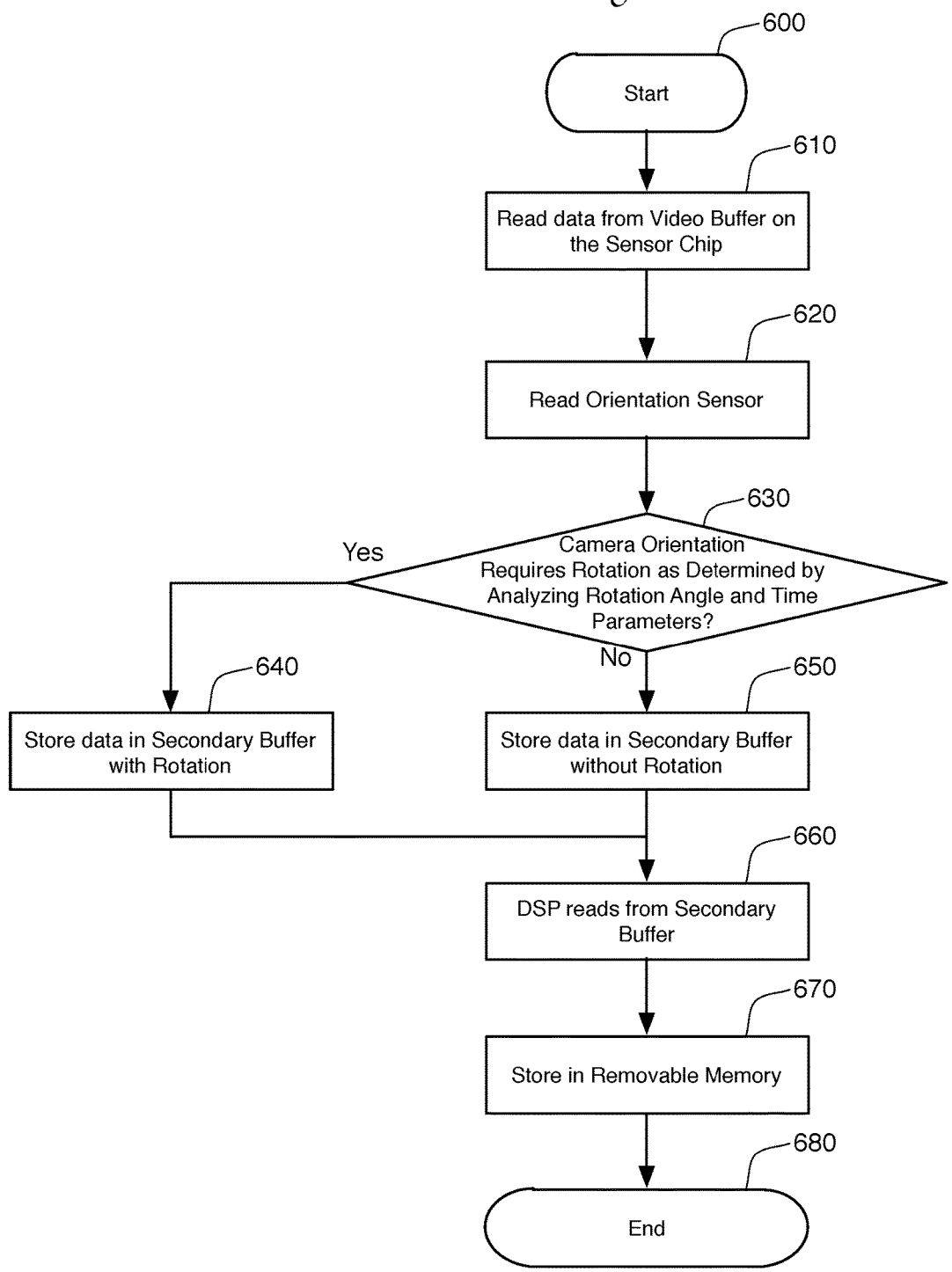

VIDEO ROTATION SYSTEM AND METHOD

CROSS-REFERENCE TO RELATED APPLICATION

This application is a continuation of U.S. patent application Ser. No. 12/985,852, entitled "Video Rotation System and Method" and filed Dec. 2, 2012, which is hereby incorporated by this reference in its entirety.

FIELD OF THE INVENTION

The present application relates to the field of video recording devices. More particularly, the described embodiments relate to a video recording system having an orientation sensor, wherein the video data received from an image sensor is rotated according to the orientation sensor prior to recording the video data as a digital video file.

BRIEF DESCRIPTION OF THE DRAWINGS

FIG. 4 is a flow chart showing a process used to implement an exemplary embodiment of the present invention.

DETAILED DESCRIPTION

Figure 1:
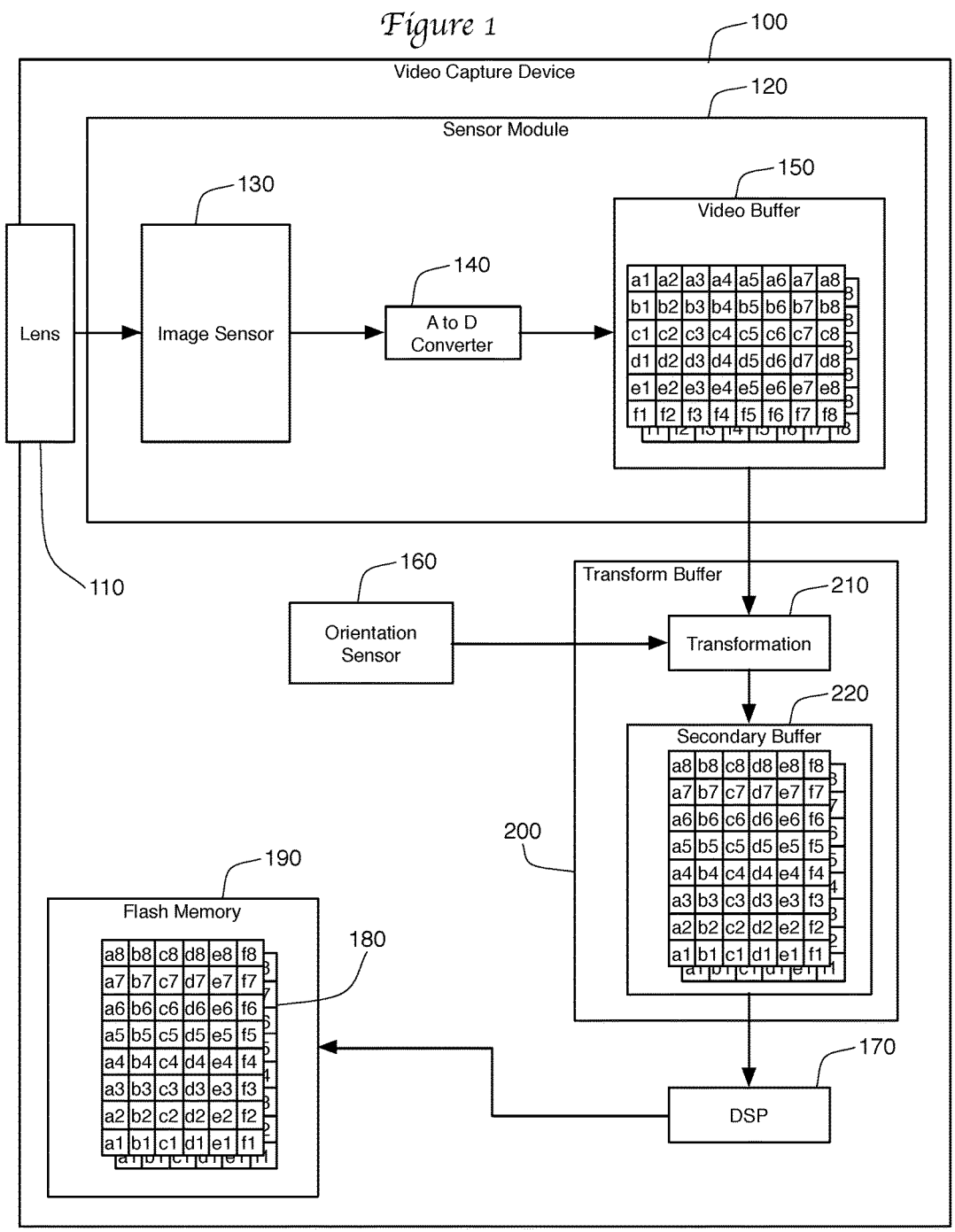
FIG. 1 is a schematic view of the major components of a first embodiment of the present invention.

FIG. 1 shows the primary internal components of a video capture device 10 utilizing a first embodiment of the present invention. The device 10 may be a dedicated video camera that performs no other functions. Alternatively, the device 10 may be a multi-purpose device, such as a still camera that also is able to capture video data. Multi-purpose devices may also include non-image related functionality, such as a various smart phone that allows cellular phone connections, provides GPS mapping functions, and accesses Internet data as well as captures still and video images. These additional functionalities are implemented through a variety of components and circuitry that are not set forth in FIG. 1 as they are not directly relevant to the capture of video files.

The video capture device 100 records video images by receiving light that is passing through a lens 110 at an image sensor module 120. The light sensitive portion of the chip 120 is the image sensor 130. The image sensor 130 is responsible for converting photons received through the lens 110 into an electrical signal. The image sensor 130 may be based on well known CCD or CMOS technology. Alternative image sensor technologies, whether existing or developed in the future, could also be implemented in the video capture device 100.

In most implementations, the electrical signals received from the image sensor 130 are converted into digital data and amplified. With CCD sensors, for instance, individual photons falling on a pixel of the image sensor increases the voltage stored at that pixel. To create an image from these voltages, the voltages at each pixel must be read, digitized, and amplified, which is accomplished by analog to digital converter component 140. The digital signals from the converter 140 are stored in an image or video buffer 150. The image sensor 130, converter 140, and buffer memory 150 are frequently manufactured together on a single card or chip 120. Manufacturers of cameras and other video devices 100 can select an appropriate chip 120 that meets their desired specification from a third party manufacturer, and then customize their device 100 by concentrating on the other components of the device 100.

The buffer memory 150 holds one or more frames of data in an easily accessible format. In FIG. 1, video buffer 150 is shown holding multiple frames of data. For ease in understanding the present invention, the frame of data is shown in a simplified manner containing only 48 pixels. The buffer 130 is shown with six rows of pixels (rows a-f), with each row containing eight columns (1-8). The upper left pixel is identified as pixel a1, and the lower right pixel is identified as pixel f8. The video buffer 150 is accessible from components outside the image sensor module 120 on a pixel-by-pixel basis. Typically, the buffer is designed to be read row-by-row, with row 'a' being first read from column 1 to 8, and then row 'b', and so on.

Most sensor modules 120 utilize a rectangular array of pixels in the image sensor 130. In the simplified example of FIG. 1, the array is six rows tall and eight columns wide. Because the image sensor 130 is not square, images taken by the image sensor 130 can be considered to be in landscape mode (the picture is wider than it is tall) or portrait mode (the picture is taller than it is wide).

In still cameras, it is important to identify the orientation of the camera so that a flag can be stored along with the image data indicating whether the stored image is in a portrait or landscape configuration. To determine this orientation, most still cameras today utilize one or more position or orientation sensors 160. These sensors 160 can take the form of accelerometers or gyroscopic sensors, and are designed to detect and report the orientation of the video capture device 100 when an image is recorded. One accelerometer that could be used to provide the functionality is model number LIS331DLH, a 3-axis smart motion sensor from STMicroelectronics (Geneva, Switzerland). An example gyroscopic sensor would be a microelectromechanical system (or "MEMS") gyroscope such as the L3G4200DH digital gyroscope also sold by STMicroelectronics. The combination of a 3-axis accelerometer and gyroscope would allow the camera device 100 to have more detailed knowledge of its current position than either sensor acting alone. For ease in description, the one or more accelerometer or gyroscopic sensors used in the video capture device 100 will be referred to collectively as the orientation sensor 160. In addition, one skilled in the art would appreciate that improvements made to art of orientation sensors could be applied to the device 100.

Setting an orientation flag in the meta data associated with a still image is sufficient for a camera to successfully distinguish between a portrait and a landscape photograph. The image is stored in a known digital image format, such as JPG, GIFF, or a proprietary "RAW" format along with the orientation flag. There is no need to actually rotate the image before creating and storing the digital image format file, as it is a simple matter to rotate the image according to the orientation flag whenever the image is displayed from the digital image format file. Display devices, printers, and image viewing and editing software all recognize the orientation flag in still image files, and handle the files appropriately.

Unfortunately, the use of an orientation flag is not an effective solution in video image capture devices 100. There is no universally accepted flag convention to indicate when a video image file was captured in landscape or portrait mode by the image sensor 130. Even if there were, the process rotating a video file on the fly is a much more processor intensive task than rotating a still image file. The decoding of a compressed video file, such as an AVC or H.264 file, is itself a difficult task for most processors, and the additional burden of rotating a video file on demand according to an orientation flag would be difficult or impossible for most present day devices.

To overcome this difficulty, the video capture device 100 shown in FIG. 1 uses input from the orientation sensor 160 to rotate the image data before the data is stored in the compressed video file. In the embodiment shown in FIG. 1, this is accomplished using a second transform buffer 200. The transform buffer 200 includes a transformation circuit 210 that accepts input from the orientation sensor 160 and, when appropriate, rotates the pixel-based frame data stored in the video buffer 150. The rotated frame data is then provided by the transformation circuit 210 to a secondary buffer 220 that stores the rotated data.

In the preferred embodiment, the transformation circuit 210 will rotate the image clockwise 90, 180, or 270 degrees, or will not rotate the image at all. The selection between these four options is based upon the orientation of the device 100 as communicated by the sensor 160. The orientation sensor 160 may provide detailed information about the orientation of the video capture device 100, including individual readings from a 3-axis accelerometer and/or a gyroscope. The transformation logic 210 can interpret these inputs to determine the correct option for the image based on the device's current orientation. Alternatively, the orientation sensor 160 may merely indicate to the transformation circuit 210 which of the four options to perform.

If no transformation is required, the transformation circuit 210 merely passes the pixel data from the video buffer 150 to the secondary buffer 220. If transformation is required, the transformation circuit 210 will read the data from the video buffer in a normal fashion, but will store the data in the secondary buffer as necessary to perform the rotation. In FIG. 1, the data in the secondary buffer 220 is shown rotated 270 degrees clockwise (or 90 degrees counter-clockwise). If the data is read from the video buffer 150 left-to-right from top to bottom, the first set of data read will be pixels a1, a2, a3, a4, a5, a6, a7, and a8. To rotate this data 270 degrees, the data will be input into the secondary buffer bottom-to-top from left to right as is shown in FIG. 1. A 90-degree clockwise rotation would require placing the data in the secondary buffer top-to-bottom from right to left. Finally, a 180-degree rotation would require inserting the data in the secondary buffer right-to-left from bottom to top.

The implementation of these different rotation possibilities is performed by the transformation circuit 210. This circuit could include programming instructions stored in tangible, non-transitory, memory devices such as flash memory or ROMS. The instructions may be executed directly from the non-transitory memory, or may be first loaded into RAM for faster processing. The transformation circuit 210 may also include a general purpose CPU, such as those provided by Intel Corporation (Santa Clara, Calif.), Advanced Micro Devices, Inc. (Sunnyvale, Calif.), or ARM Holdings (Cambridge, England). These general purpose CPUs can implement a variety of programming instructions including the rotation processes described above. The actual memory and processor logic can appear on the same silicon chip or the same physical processor board as the secondary buffer 220. It is also possible to implement the transformation circuitry 210 on a general purpose processor that operates for the benefit of the entire video capture device 100. This processor could perform a variety of functions for the device 100 in addition to the transformation process 210. In yet another embodiment, the processor and instructions that form the transformation circuitry 210 could be combined in the form of a programmable logic device specially programmed to perform the rotational functions described above. In this context, programmable logic devices include devices that are programmed after manufacture, such as field-programmable gate arrays (FPGAs), and devices that are programmed as part of their manufacture, such as application-specific integrated circuit (ASICs) and systems-on-a-chip (SoCs). In some cases, the transformation circuit 210 and the secondary buffer 230 can be implemented on the same programmable logic device.

Once the data has been transformed into the secondary buffer 220, it is possible to compress and convert the data into a video data file. This process is typically performed by a digital signal processor or DSP chip 170. There are various algorithms or codecs for creating a video data file that might be used by the DSP 170. Some of the more popular codecs include MPEG-2 video, MPEG-4 video, H.264/AVC, Windows Media Video, and variations thereto. The majority of codecs compress the video information by comparing multiple frames of data and removing duplicative information that remains consistent between the frames. Consequently, the DSP 170 will generally analyze multiple frames of data simultaneously. In order to perform such analysis as efficiently as possible, the DSP 170 might contain its own memory or buffer to store frames or partial frames of data. As the use of such memory to efficiently perform various codecs is outside the scope of this disclosure, FIG. 1 does not shown any additional buffer or memory within DSP 170. Regardless of whether it contains internal memory, the DSP 170 takes the image data as it appears on an external buffer (such as secondary buffer 220), applies its particular codec to this data stream, and creates a video data file 180. This video data file 180 is then stored in a removable, non-transitory memory such as flash memory 190.

The DSP 170 is designed to read a frame of data from a video buffer in a known, predictable way. For example, the DSP 170 may read buffer data left-to-right from top to bottom. By interposing the transform buffer 200 between the video buffer 150 of the sensor module 120 and the DSP chip 170, it is possible to use standard, off the shelf components for the sensor module 120 and DSP 170. Neither device need be aware of the transformation that occurs within the transform buffer 200. In this way, updates and improvements made to sensor modules 120 and DSPs 170 made by third-party manufacturers may be easily incorporated into the video capture device 100 without the need to remanufacture the transformation capabilities of the device 100 to conform to the new devices.

Of course, it would be possible to redesign the sensor module 120 or DSP 170 to implement the pre-compression rotation of a video file without the need for a secondary or transform buffer 200. This possibility is shown in the second video capture device embodiment 300 shown in FIG. 2. As was the case with device 100, this second video camera 300 receives light from a lens 310 at an image sensor 330 of a sensor module 320. A converter 340 transforms the electrical signals received from the image sensor 330 to pixilated, digital data that is stored in the video buffer 350 of the sensor module 320. In this case, however, the sensor module 320 has a rotational transformation circuit 400 as opposed to locating the transformation logic on the transformation buffer 200. As was the case with circuitry 210, the transformation circuitry 400 receives input from an orientation sensor 360 to determine whether any rotation of the image in the video buffer 350 is necessary in light of the orientation of the video capture device 300. As was the case with DSP 170, the DSP 370 in FIG. 2 can be a standard digital signal processor that is unaware of any rotation accomplished on the data it receives as input.

If the orientation sensor 360 indicates that no rotation is necessary, the transformation circuitry 400 simply passes the data in the video buffer 350 of the sensor module 320 to the DSP. If rotation is desired, however, the transformation circuitry 400 must transform the data in the video buffer 350 before transmitting the data to the DSP 370. It is possible to implement the sensor module 320 with a secondary buffer like the buffer 220 shown in FIG. 1. If this is accomplished, the transformation circuitry 400 can behave in the same way as circuitry 210—reading the pixel data from the video buffer 350 in standard fashion and reordering the data as necessary for rotation when saving the data into the secondary buffer. The DSP would then read the data from the secondary buffer directly.

However, since the sensor module 320 is specially designed to include the transformation functionality, it is possible to avoid the two-buffer implementation of FIG. 1. Removing the need for the additional buffer will speed up the process of saving the video data in the flash memory device 390 and decrease the cost of the video capture device 100. Because there is no secondary buffer in the embodiment shown in FIG. 2, the transformation circuitry 400 must accept requests for particular data from the DSP 370, and then read data from video buffer 350 in the order necessary to perform the transformation. For example, the orientation sensor 360 may indicate that a 270-degree clockwise rotation is required. To perform this rotation, the transformation circuitry 400 must read from the video buffer 350 top-to-bottom from right to left. Assuming the DSP 370 requests the top row of the video buffer 350, it would be expecting to receive the following pixels: a1, a, a3, a4, a5, a6, a7, a8. The transformation circuitry will receive the request for the top row, but instead will read top-to-bottom from right to left, and respond with a8, b8, c8, d8, e8, and f8. The DSP 370 will receive this data as normal pixel data, and will implement its codec to store the video data file 380 on flash memory 390. This may involve temporary storage of some pixel data within the DSP 370 in order to perform the codec, as described above. The resulting file 380 that emerges from the DSP 370 will have the frame data rotated 270 degrees clockwise, as shown in FIG. 2.

Figure 2:
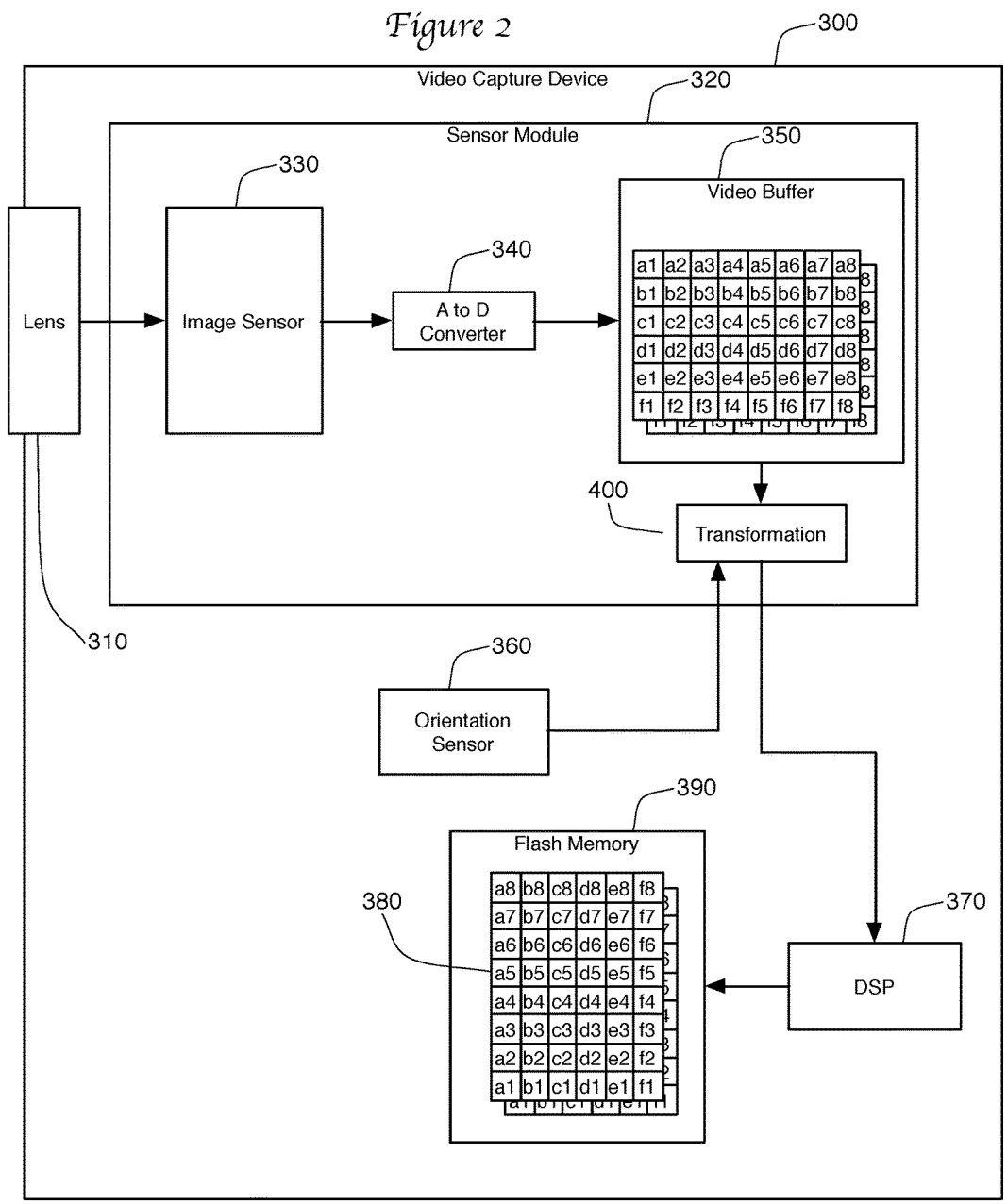
FIG. 2 is a schematic view of the major components of a second embodiment of the present invention.

The transformation circuit 400 could also be implemented on the chip containing the digital signal processor 370 (not shown in FIG. 2). Once again, this embodiment would locate the transformation circuit between the video buffer 350 and the primary processing circuitry of the DSP 370. As described above, this transformation circuitry can either contain a secondary buffer, or be able to selectively access individual pixels on the video buffer 350 as desired by the DSP 370.

One of the benefits of rotating frame data prior to encoding by a DSP is that it is possible to rotate the image within the middle of an stored digital video file. Returning to FIG. 1, the transformation circuitry 210 will determine how the image data will be rotated according to input from the orientation sensor 160. When a video recording begins, the transformation buffer 200 will ensure that the data being fed to the DSP 170 is rotated as necessary, thereby ensuring that the video file is recorded in the flash memory 190 right-side-up. During the recording, the video capture device 100 could be rotated by the user. When this occurs, the orientation sensor 160 will detect this rotation and instruct the transformation buffer 200 to rotate the image data. In some circumstances, the transformation buffer 200 will ignore this orientation change until the current video recording is complete. One reason this might be ignored is that many video codecs cannot seamlessly move between different resolutions within a single video file. A video file that begins in landscape mode (wider than it is tall) cannot easily transition to portrait mode (taller than wide). In some cases, it is possible to create a multiple bitstream (MSS) file or segment video files into different partitions. However, video files with these elements frequently cause trouble with video display and editing software.

Figure 3:
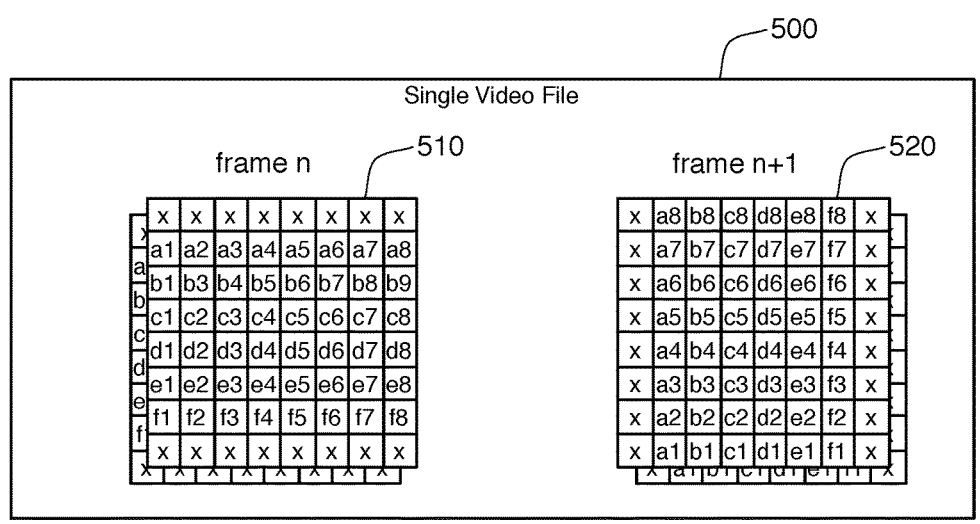
FIG. 3 is a schematic view of a video file saved by the present invention showing rotation between frames of a single video file.

A different solution is implemented in digital video file 500 shown in FIG. 3 as it would be stored on a non-transitory memory device such as a flash memory card. In this embodiment, a landscape image is converted into a square digital video image by adding padding to the top or bottom of the frame. The padding is shown in frame n 510 with an "x" placed in each padding pixel. The padding data is generally a solid color such as black or gray, which creates the well-known bars at the top and bottom of the video.

Between the times that frame n 510 and frame n+1 520 were provided to the digital signal processor 170, the orientation sensor 160 indicated that the orientation of the video capture device 100 has changed. The transformation circuitry 210 rotated frame n+1 520 in the secondary buffer 220 and fed the frame to the DSP 170. Because the frame data is being presented as a square image frame, it is not necessary to change the image size of the data presented to the DSP 170. Consequently, the DSP 170 simply accepts frame n+1 520 as the next frame in the video stream, and records its as such in the video file 500. Note that it is not necessary to segment the video file or change any of the encoding parameters, such as frame size, within the video file to implement this video rotation in the middle of video file 500.

To prevent a video feed from frequently switching between different rotations, it is preferred that the current rotation of the image data be implemented in a somewhat "sticky" fashion. For instance, if rotation were to occur as soon as a camera is rotated over 45 degrees from level, and then rotates back immediately when the camera is rotated less than 45 degrees from level, a camera held at approximately 45 degrees would alternate between the two different orientations repeatedly. This would cause the resulting video file to be effectively unusable. This result could be avoided in multiple ways. For instance, a rotation from landscape to portrait might require that the camera be tilted at least 50 degrees from level, while a rotation from portrait to landscape could require that the camera be tilted less than 40 degrees from level. When the camera is held between 40 and 50 degrees from level, the camera would remain in its previous orientation. Alternatively, once the image file has been rotated, the camera could prevent returning to a previous orientation for a short time period, such as one second. This time period could also be implemented as a requirement for the original rotation as well—meaning that the image will never rotate to a new position unless that new position is held for some minimum time period.

FIG. 4 shows a flow chart 600 showing one method for implementing the first embodiment of the present invention with the video capture device 100 shown in FIG. 1. The flow chart starts by reading data from the video buffer 150 on the sensor module 120 at step 610. At step 620, data from the orientation sensor 160 is read to determine the current orientation of the device 100. Step 630 determines if the current orientation of the device 100 requires that the video signal be rotated. As explained above, the device 100 may implement various safeguards to prevent frequent or inadvertent rotation, such as minimum time periods or excessive rotation angles. These safeguards would be implemented as part of step 630. In addition, the device 100 may be set to prevent any rotation in the middle of a single video file 180.

If rotation is required, step 640 applies the appropriate rotation to the current frame and stores this frame in secondary buffer 220. If no rotation is needed, step 650 stored the frame data un-rotated in the secondary buffer 220. The digital signal processor 170 then reads the data from the secondary buffer 220 in step 660. The DSP 170 then applies its codec to create a digital video file, and stores the file 180 in removable, non-transient memory 190 at step 670. The process ends at step 680.

If the implementation described in connection with FIG. 2 is implemented, there will be no secondary buffer. In these implementations, step 630 will still determine whether the camera orientation requires rotation. If no rotation is required, the transformation circuit will simply provide the data from the video buffer to the DSP in the order expected by the DSP. If rotation is required, the transformation circuit will need to read the data from the video buffer in a different order than that expected by the DSP, thereby achieving rotation by altering the read order of the video buffer.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A video capture device, comprising:
   a) a sensor module having an image sensor that converts an optical image into a raw electronic image;
   b) a video buffer that stores the raw electronic image, the raw electronic image being unprocessed by a video codec, the video buffer storing the raw electronic image in a matrix with rows and columns;
   c) a first silicon chip separate from the sensor module, the first silicon chip having a digital signal processor that converts input image data to a video data file according to a video codec;
   d) a non-transient memory device that stores the video data file;
   e) an orientation sensor that provides an orientation signal reflecting an orientation of the video capture device; and
   f) a second silicon chip separate from the sensor module and from the first silicon chip, the second silicon chip having transformation circuitry that receives the orientation signal and rotates the raw electronic image in the video buffer accordingly, wherein the transformation circuitry provides the rotated electronic image to the digital signal processor as the input image data, further wherein the transformation circuitry rotates the raw electronic image by one of 90, 180, or 270 degrees by altering a read order of the rows and columns as the raw electronic image is read from the video buffer.

2. A method for processing video data from a video capture device, comprising:
   a) using an image sensor on a sensor module, converting an optical image into a raw electronic image;
   b) storing the raw electronic image in a matrix with rows and columns on a video buffer, the raw electronic image being unprocessed by a video codec,
   c) using a digital signal processor on a first silicon chip that is separate from the sensor module, converting input image data to a video data file according to the video codec;
   d) storing the video data file in a non-transient memory device;
   e) providing, by an orientation sensor, an orientation signal reflecting an orientation of the video capture device;
   f) using transformation circuitry of a second silicon chip, which is separate from the sensor module and from the first silicon chip,
      i) receiving the orientation signal and rotating the raw electronic image in the video buffer by one of 90, 180, or 270 degrees, by altering a read order of the rows and columns as the raw electronic image is read from the video buffer, and
      ii) providing the rotated electronic image to the digital signal processor as the input image data.

3. The method of claim 2, wherein the orientation sensor comprises a sensor selected from the set of an accelerometer and a gyroscope.

4. The method of claim 2, wherein the transformation circuitry includes programming instructions stored on a memory device and a processor for implementing those instructions.

5. The method of claim 2, wherein the transformation circuitry comprises a programmable logic device programmed to implement transformation logic.

6. The method of claim 2, wherein the transformation circuitry stores the rotated electronic image on a secondary buffer external to the digital signal processor, further wherein the rotated electronic image is read from the secondary buffer by the digital signal processor.

7. The method of claim 6, wherein the transformation circuitry and the secondary buffer form part of one programmable logic device.

8. The method of claim 6, wherein the image sensor and video buffer are located on a sensor module.

9. A video capture device, comprising:
   a) an image sensor, which converts a sequence of optical images into a sequence of frames, each such frame containing a raw electronic image;
   b) a first buffer, upon which the sequence of frames are stored without processing the sequence of frames by a video codec, the first buffer representing each frame in the sequence of frames as a matrix with rows and columns;
   c) an orientation sensor that, based on a first orientation and a second orientation of the video capture device, creates a first orientation signal, applicable to a first subsequence of the sequence of frames, and a second orientation signal, applicable to a second subsequence of the sequence of frames;
   d) a transformation circuit, which,
      (i) in accordance with the first orientation signal, creates a first square electronic image, by rotating a frame from the first subsequence by a first angle of 90, 180, or 270 degrees clockwise, wherein the rotation is effected by altering a read order of the rows and columns of the frame from the first subsequence as the frame from the first subsequence is read from the first buffer, and padding the rotated frame by adding padding pixel data; and
      (ii) in accordance with the second orientation signal, creates a second square electronic image, by rotating a frame from the second subsequence by a second angle of 90, 180, or 270 degrees clockwise, wherein the rotation is effected by altering the read order of the rows and columns of the frame from the second subsequence as the frame from the second subsequence is read from the first buffer, and padding the rotated frame by adding padding pixel data, and wherein the second angle is distinct from the first angle;

e) a digital signal processor, which receives the first and second square electronic images, and creates a single video image file by applying a video codec to a sequence of square electronic images that includes the first and second square electronic images; and f) a non-transitory memory device, upon which the video image file is stored.

10. The video capture device of claim 9, further comprising:

g) a second buffer, in which the first and second square electronic images are stored before the first and second square electronic images are transferred to the digital signal processor.

11. The video capture device of claim 9, wherein the video codec is selected from at least one of MPEG-2 video, MPEG-4 video, AVC/H.264, and Windows Media.

12. The video capture device of claim 9, wherein rotating the frame from the first subsequence further comprises:

i) receiving a request for image data from a digital signal processor, the digital signal processor expecting data to be transmitted in a first order;

ii) analyzing the first orientation signal to determine a degree of rotation;

iii) delivering the frame from the first subsequence to the digital signal processor in a second order different from the first order for the purpose of implementing the degree of rotation.

13. The video capture device of claim 9, wherein the transformation circuit, upon determining based on an orientation signal from the orientation sensor that a rotation angle for the video capture device exceeds a first predefined angle for more than a predefined time period, rotates a frame from the sequence of frames 90 degrees clockwise.

14. The video capture device of claim 9, wherein the transformation circuit, upon determining based on an orientation signal from the orientation sensor that a rotation angle for the video capture device exceeds a first predefined angle, rotates a frame from the sequence of frames, from a non-rotated orientation to an orientation that is rotated 90 degrees clockwise.

15. The video capture device of claim 14, wherein no rotation is allowed within a predetermined time period of at least one second after a previous rotation.

16. The video capture device of claim 14, wherein the transformation circuit, upon determining based on an orientation signal from the orientation sensor that a rotation angle for the video capture device is less than a second predefined angle, rotates the frame from the sequence of frames, from the orientation that is rotated 90 degrees clockwise to a non-rotated orientation.

17. The video capture device of claim 16, wherein the first predefined angle is greater than 45 degrees clockwise and the second predefined angle is less than 45 degrees clockwise.

* * * * *